(12) United States Patent
Dahms (10) Patent No.: US 7,543,854 B2
(45) Date of Patent: Jun. 9, 2009

(54) COUPLING ASSEMBLY WITH LATCHING SLEEVE

(75) Inventor: Jason W. Dahms, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 37 days.

(21) Appl. No.: 11/044,515

(22) Filed: Jan. 27, 2005

(65) Prior Publication Data

US 2005/0161938 A1    Jul. 28, 2005

Related U.S. Application Data

(60) Provisional application No. 60/539,530, filed on Jan. 27, 2004.

(51) Int. Cl.
*F16L 35/00* (2006.01)
(52) U.S. Cl. .......................... 285/39; 285/321
(58) Field of Classification Search .................. 285/39, 285/308, 321, 902, 307, 319
See application file for complete search history.

(56) References Cited

U.S. PATENT DOCUMENTS

| | | | | |
|---|---|---|---|---|
| 2,182,797 | A | * 12/1939 | Dillon | ........................ 285/308 |
| 2,479,960 | A | 8/1949 | Osborn | |
| 2,848,255 | A | 8/1958 | Klein et al. | |
| 3,177,018 | A | 4/1965 | Goodwin | |
| 3,398,977 | A | 8/1968 | Yoneda | |
| 3,639,890 | A | * 2/1972 | Stevens et al. | ............... 439/352 |
| 3,773,360 | A | 11/1973 | Timbers | |
| 3,810,073 | A | * 5/1974 | Zajac et al. | ................. 439/352 |
| 3,887,222 | A | 6/1975 | Hammond | |
| 4,105,226 | A | 8/1978 | Frey et al. | |
| 4,240,654 | A | 12/1980 | Gladieux | |
| 4,872,710 | A | 10/1989 | Konecny et al. | |
| 4,943,091 | A | * 7/1990 | Bartholomew | ................ 285/12 |
| 5,022,687 | A | 6/1991 | Ariga | |
| 5,042,848 | A | * 8/1991 | Shiozaki | ..................... 285/277 |
| 5,076,541 | A | 12/1991 | Daghe et al. | |
| 5,181,751 | A | * 1/1993 | Kitamura | ..................... 285/39 |
| 5,226,682 | A | 7/1993 | Marrison et al. | |
| 5,261,707 | A | * 11/1993 | Kotake et al. | ................ 285/308 |
| 5,284,369 | A | * 2/1994 | Kitamura | ..................... 285/322 |

(Continued)

FOREIGN PATENT DOCUMENTS

DE    3825866 A1 *  2/1990

(Continued)

*Primary Examiner*—Aaron M Dunwoody
(74) *Attorney, Agent, or Firm*—Benesch, Friedlander, Coplan & Aronoff LLP (57) ABSTRACT

A coupling assembly includes a first coupling member extending along an axis from a leading end to a trailing end and having an exterior that includes a first locking surface. A second coupling member extends from a receiving end to a remote end and includes a receiving portion sized to receive the first coupling member. The second coupling member also includes a second locking surface. A latching sleeve is positioned between the first and second coupling members and includes a bead. The latching sleeve is sized such that as the first coupling member is inserted into the second coupling member, the latching sleeve is compressed as the bead engages the second coupling member and then expands as it moves over the second locking surface to become engaged between the first locking surface on the first coupling member and the second locking surface on the second coupling member.

18 Claims, 7 Drawing Sheets

U.S. PATENT DOCUMENTS

| | | | |
|---|---|---|---|
| 5,707,085 A * | 1/1998 | Kubiak | 285/86 |
| 5,709,415 A | 1/1998 | Witter | |
| 6,183,020 B1 | 2/2001 | Luft | |
| 6,186,557 B1 | 2/2001 | Funk | |
| 6,267,416 B1 * | 7/2001 | Ferreira et al. | 285/319 |
| 6,302,451 B1 * | 10/2001 | Olson | 285/330 |
| 6,450,545 B1 | 9/2002 | LeMay et al. | |
| 6,494,494 B2 | 12/2002 | Vogel et al. | |
| 6,517,121 B1 | 2/2003 | Cresswell | |
| 6,530,604 B1 | 3/2003 | Luft et al. | |
| 6,533,327 B1 | 3/2003 | Twardawski et al. | |
| 6,554,320 B2 | 4/2003 | Cresswell | |
| 6,557,824 B1 | 5/2003 | Jenski, Jr. et al. | |
| 6,588,805 B2 | 7/2003 | Persohn et al. | |
| 6,592,151 B2 | 7/2003 | Densel et al. | |
| 6,604,760 B2 * | 8/2003 | Cresswell et al. | 285/39 |
| 6,637,781 B1 | 10/2003 | Seymour, II | |
| 6,749,231 B2 | 6/2004 | LeMay et al. | |
| 6,769,720 B2 | 8/2004 | Dahms et al. | |

FOREIGN PATENT DOCUMENTS

| | | |
|---|---|---|
| EP | 0764808 | 3/1997 |
| EP | 1235023 | 8/2002 |
| JP | 01288694 A * | 11/1989 |
| JP | 05256389 A * | 10/1993 |
| WO | WO 01/38771 | 5/2001 |

* cited by examiner

COUPLING ASSEMBLY WITH LATCHING SLEEVE

CROSS REFERENCE TO RELATED APPLICATIONS

This application claims priority to U.S. provisional application 60/539,530, filed on Jan. 27, 2004, which is incorporated herein by reference in its entirety.

BACKGROUND OF THE INVENTION

1. Field of the Invention

The present invention relates to push-to-connect style fluid connectors and, more particularly, to push-to-connect style fluid connectors that include a latching sleeve to secure a male coupling member within a female coupling member.

2. Description of the Related Art

There are many industrial applications where a high pressure hydraulic system requires that several connections be made between a hose assembly and a component, such as a pump, motor, valve, etc. Initially there were no push-to-connect (threadless) connection systems available that could satisfactorily operate at high pressure, prior art systems have made use of threaded fittings to make this connection. Recently, push-to-connect style coupling assemblies have become available that can operate at high pressures. In one such coupling assembly, shown in FIGS. 1 and 2, a resiliently expandable locking ring is employed to secure a male coupling member within a female coupling member. While this design has proven successful in use, the locking ring is a separate component that must be inserted into the female coupling member during manufacture. If the locking ring is lost or if the manufacturer inadvertently fails to properly assemble the female coupling member with a locking ring, the male coupling member may not be able to connect with the female coupling member. For these and other reasons, an improved push-to-connect style coupling assembly is desired that does not exhibit the manufacturing limitations of the prior art locking ring design and is tailored to make false connections less likely to occur.

SUMMARY OF THE INVENTION

A coupling assembly is provided that includes a first coupling member extending along an axis A-A from a leading end to a trailing end and having an exterior that includes a first locking surface. The coupling assembly also includes a second coupling member that extends from a receiving end to a remote end and includes a receiving portion sized to receive the first coupling member. The receiving portion of the second coupling member includes a second locking surface. A latching sleeve is positioned between the first and second coupling members and includes a bead. The latching sleeve is sized such that as the first coupling member is inserted into the second coupling member, the latching sleeve is compressed as the bead engages the second coupling member and then expands as the bead moves over the second locking surface to become engaged between the first locking surface on the first coupling member and the second locking surface on the second coupling member.

Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION OF THE INVENTION

Certain terminology will be used in the foregoing description for convenience in reference only and will not be limiting. The terms "forward" and "rearward" will refer to directions forward and rearward of the coupling assembly shown in the drawings. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivative and equivalents thereof.

Figure 3:
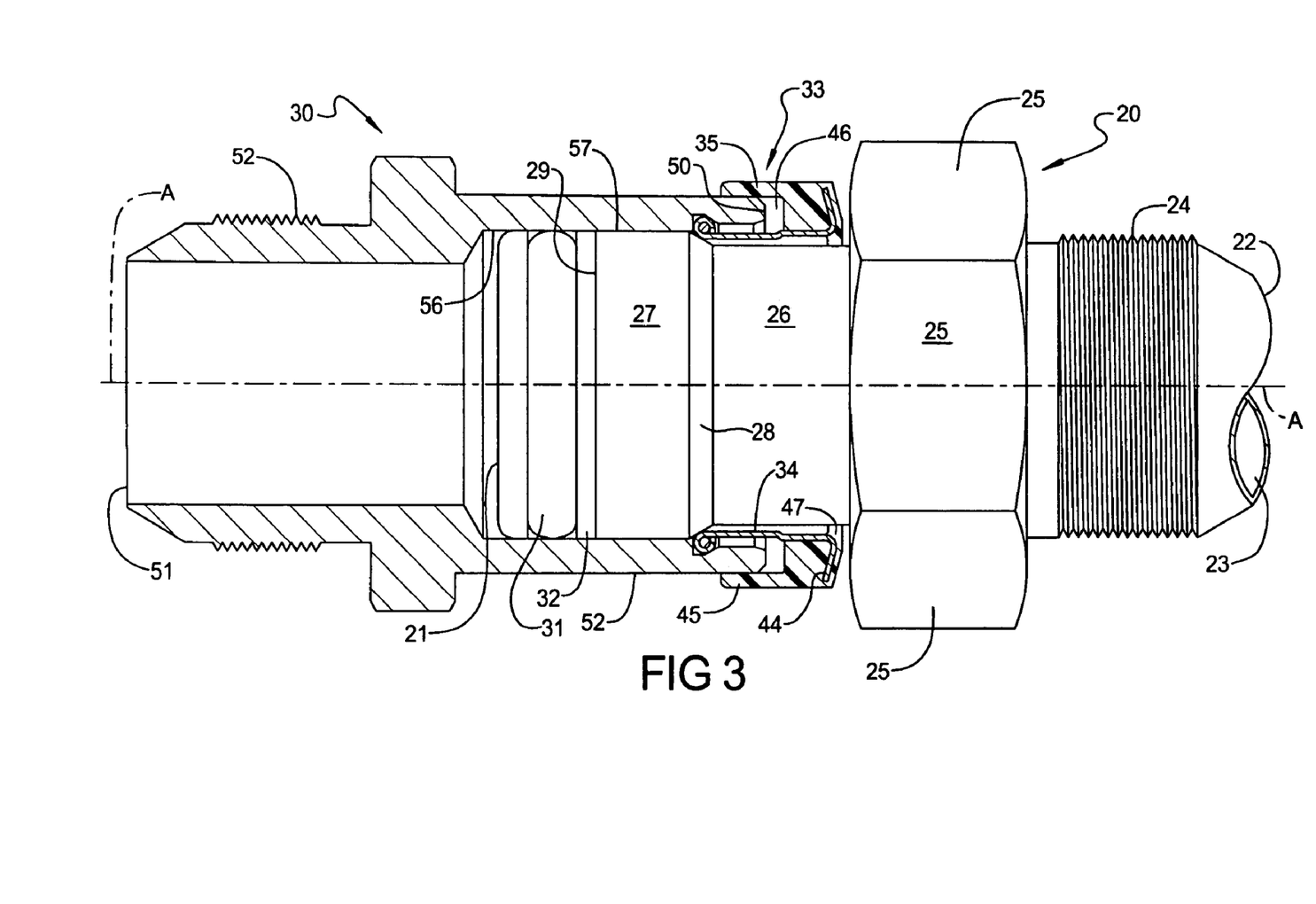
FIG. 3 is a partial cross-sectional view of a coupling assembly according to an embodiment of the invention.

Referring to FIG. 3, a coupling assembly according to an embodiment of the present invention is shown that includes a first or male member 20 and a second or female member 30. Each of the male member 20 and the female member 30 extends along an axis A-A when the assembly is in the coupled position as shown in FIG. 3. The male member 20 extends from a leading end 21 intended for insertion into the female member 30 to a trailing end 22, and has a passageway 23 extending therethrough. If desired, the trailing end 22 may be provided with external threads 24 for attachment to a threaded coupling (not shown) and a series of flats 25 defining a non-circular (e.g., hexagonal) cross-section for engagement by a wrench.

Forwardly of the hexagonal cross-section defined by the flats 25, the male member 20 has a trailing exterior cylindrical surface 26 and a leading exterior cylindrical surface 27, which are separated by a first locking surface 28 that tapers rearwardly and inwardly from a leading exterior surface 27 to meet trailing exterior surface 26. In a particular configuration, first locking surface 28 exhibits a linear profile that tapers at an angle in the range of 35° to 55° relative to the axis A-A, such as, for example, an angle of about 45°. However, first locking surface 28 is not limited to the linear profile shown in FIGS. 3 and 4 and may include non-linear profiles, including, for example, a cup-shaped or concave profile, without departing from the scope of the present invention.

Figure 4:
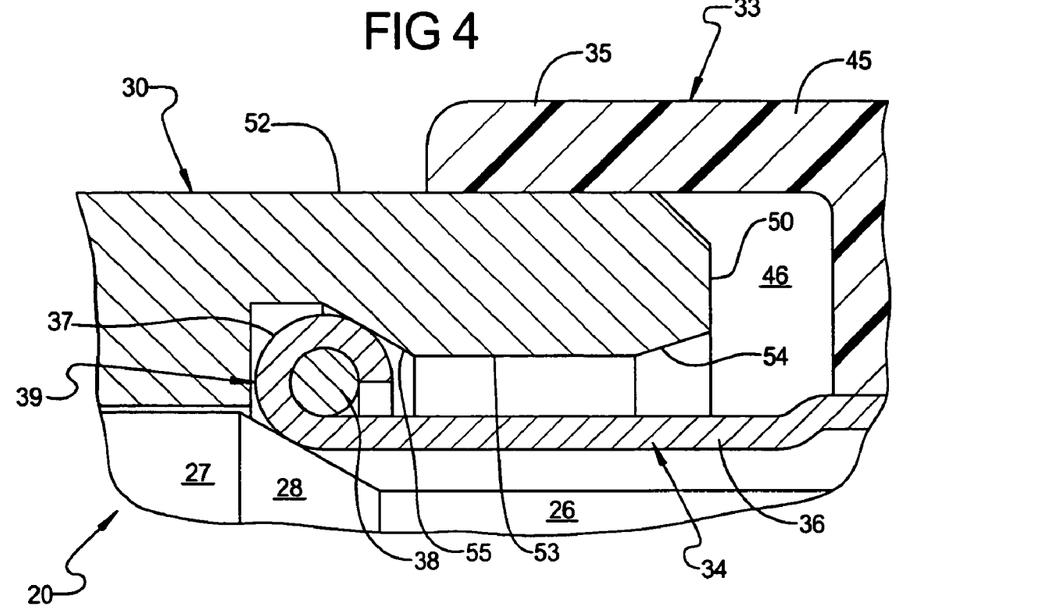
FIG. 4 is a detailed cross-sectional view of a connecting interface of the coupling assembly shown in FIG. 3.

In the embodiment shown in FIGS. 3 and 4, leading exterior surface 27 has formed therein an outwardly facing annular groove 29 in which is positioned an annular seal 31 of neoprene or other suitable sealing material, and a rigid plastic ring 32. The plastic ring 32 has an outer diameter sized to snugly engage an inner surface of female member 30 and the annular seal 31 is sized to sealingly engage the same inner surface. The presence of the rigid plastic ring 32 serves to protect the annular seal 31 from cutting or other damage upon insertion of the leading exterior surface 27 into the female member 30. The rigid plastic ring 32 also serves to protect the annular seal 31 from damage when used in systems having high impulse flow of fluid. As will be appreciated, annular seal 31 and plastic ring 32 may be readily assembled onto the male member 20, unlike the prior art coupling shown in FIG. 1 that requires the annular seal and plastic ring to be awkwardly inserted into a groove in the interior of female member 30. However, annular seal 31 and plastic ring 32 may be received in a groove (not shown) in the female member 30 if so desired.

In an embodiment, the coupling assembly also includes a latching sleeve 33 having a rigid portion 34 and, optionally, a thermoplastic and/or elastomeric (e.g., TPE) sealing portion 35. As may be seen in FIG. 4, the rigid portion 34 includes a cylindrical wall 36 adapted to expand and contract. A leading end 37 of rigid portion 34 includes a resiliently expandable annular support member 38, such as, for example, a split locking ring or a garter spring. Annular support member 38 is secured to latching sleeve 33 within an annular bead 39. In an embodiment, bead 39 is formed by rolling the leading end 37 of rigid portion 34 around a portion of or substantially around annular support member 38. Unlike the prior art, female member 30 does not include a separate and distinct locking ring that can become lost or inadvertently never assembled into female member 30 during manufacture.

In the embodiment shown in FIGS. 3 and 4, sealing portion 35 may be molded around a flange 44 on an end of rigid portion 34 located opposite leading end 37. Sealing portion 35 may include a cylindrical wall portion 45 spaced from and substantially parallel to the cylindrical wall 36 of rigid portion 34. As can be seen in FIGS. 3 and 4, the cylindrical wall 36 and the cylindrical wall portion 45 cooperate to define a gap 46. The sealing portion 35 includes a sealing fin 47 (FIG. 3) extending radially inwardly from the flange portion 44. The sealing fin 47 snugly engages the trailing cylindrical exterior surface 26 and functions as a dust seal to prevent contaminants, such as dust and other debris, from entering the engaged coupling between latching sleeve 33 and the trailing exterior surface 26. The sealing portion 35 shown in FIGS. 3 and 4 is not limited to that shown in the drawings and may include other configurations, including those configurations that allow the male member 20 to be connected to a "direct port" female coupling (e.g., integrating the internal profile of the female coupling member 30 into a valve body or manifold).

Female member 30 extends from a receiving end 50 to a remote end 51, which may have adjacent thereto external threads 52 or other suitable connection means for fastening to a separate connection (not shown). The portion of female member 30 adjacent the receiving end 50 is provided with an exterior cylindrical surface 52 sized to be snugly received in the optional cylindrical wall 45 of latching sleeve 33 and an interior cylindrical surface 53 sized to receive therein the split cylindrical wall portion 36 of the rigid portion 34 of latching sleeve 33. A first chamfer 54 extends from receiving end 50 inwardly to interior cylindrical surface 53. A second locking surface 55, such as a chamfered surface, extends generally outwardly from interior cylindrical surface 53. When second locking surface 55 is a chamfered surface, the angle between the second chamfer 55 and interior cylindrical surface 53 is in the range of about 20° to 40°, such as, for example, about 30°. However, like first locking surface 28, second locking surface 55 is not limited to the linear profile shown in FIGS. 3 and 4 and may include non-linear profiles, such as, for example, a cup-shaped or convex profile, without departing from the scope of the present invention.

A second interior cylindrical surface 56 of smaller diameter than the first cylindrical surface 53 is positioned toward remote end 51. The second interior cylindrical surface 56 is sized to receive the leading exterior surface 27 of the first male member 20 and is engaged by annular seal 31 in the illustrated embodiment.

With reference to FIGS. 3 and 4, upon insertion of male member 20 into female member 30, the leading end 37 of latching sleeve 33 will compress as it engages first chamfer 54 and then passes through the opening defined by interior cylindrical surface 53 on female member 30 and trailing cylindrical exterior surface 26 on male member 20. To facilitate this passage, the distance between interior cylindrical surface 53 and trailing cylindrical exterior surface 26 is greater than the diameter of bead 39. As bead 39 moves past the intersection of second locking surface 55 and interior cylindrical surface 53 upon continued forward movement of male member 20, the bead 39, by virtue of the resilience of rigid portion 34 will expand to a size approaching its original size. In doing so, bead 39 will become positioned to prevent withdrawal of male member 20 from female member 30 by virtue of the bead 39 being trapped between first locking surface 28 on male member 20 and second locking surface 55 on female member 30.

As will be appreciated from viewing FIG. 4, first locking surface 28 and second locking surface 55 may be disposed at converging angles in a direction away from leading end 37 when the male member 20 is engaged to the female member 30. This convergence may result from the fact that the angle of the first locking surface 28 is less than the angle of second locking surface 55 in relation to axis A-A, as previously set forth, or vice versa. However, convergence of the angles defining second locking surface 55 and first locking surface 28 is not necessarily required, particularly when second locking surface 55 and first locking surface 28 do not exhibit the linear profile shown in FIGS. 3 and 4.

When male member 20 is fully secured or connected to female member 30, the second interior cylindrical surface 56 is sealingly engaged with annular seal 31, thereby preventing leaking of fluid. Optionally, receiving end 50 and portions of female member 30 adjacent thereto are positioned in gap 46 between cylindrical wall portion 45 of sealing portion 35 and cylindrical wall 36 of rigid portion 34. The exterior cylindrical surface 52 is snugly in contact with the interior of the cylindrical wall portion 45, thereby preventing, along with the sealing fin 47, dust and other debris from the entering the area around bead 39 when the members are in the engaged position shown in FIGS. 3 and 4.

As shown in FIG. 3, there is a gap between latching sleeve 33 and flats 25 forwardly of the hexagonal cross-section defined by the flats 25. This gap provides an indication that bead is properly positioned between first locking surface 28 and second locking surface 55 when male member 20 is locked in female member 30. This gap also allows male member 20 to be pushed forward into female member 30 to separate first locking surface 28 from bead 39 (when the coupling assembly is not pressurized). Male member 20 may then be withdrawn from female member 30 by pulling on latching sleeve 33 and male member 20 simultaneously, such that bead 39 compresses inwardly as it cams over second locking surface 55 and is allowed to pass by interior cylindrical surface 53.

Figure 5:
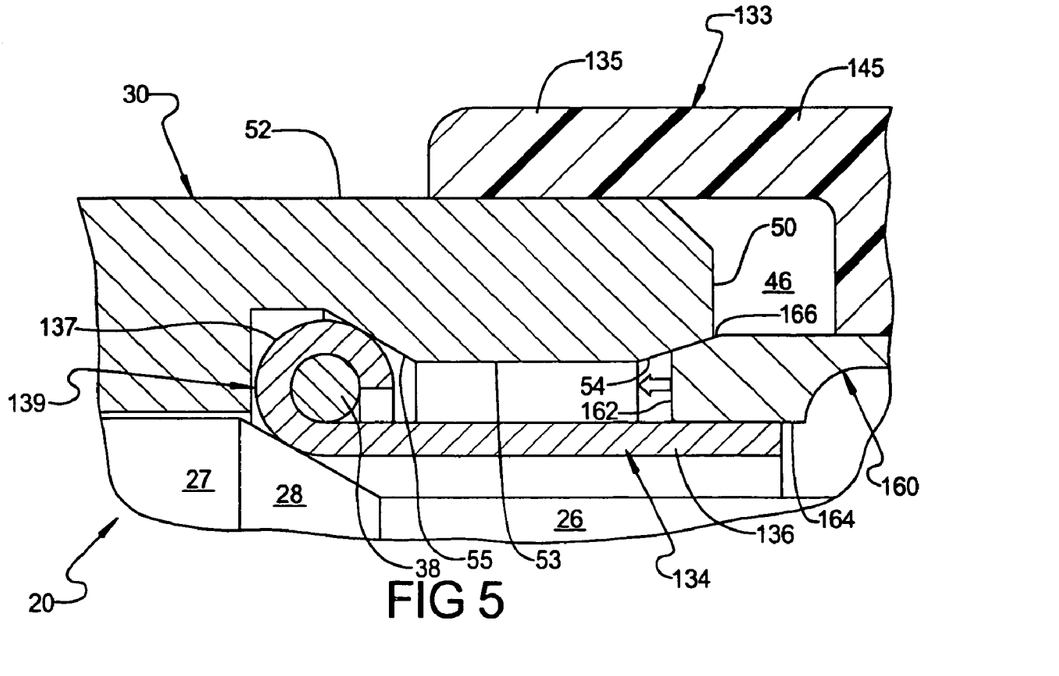
FIG. 5 is a detailed cross-sectional view of a connecting interface according to another embodiment of the present invention.

Referring to FIG. 5 another embodiment of the invention is shown. In the illustrated embodiment, male member 20 includes a latching sleeve 133 having a rigid portion 134 and a sealing portion 135. Unlike latching sleeve 33 described above and shown in FIGS. 3 and 4, rigid portion 134 and sealing portion 135 are separate components and, therefore, are axial movable relative to one another. As shown in FIG. 5, sealing portion 135 includes a compressible release sleeve 160 having a leading edge 162 and an interior cylindrical surface 164 sized to receive a split cylindrical wall 136 of rigid portion 134. Release sleeve 160 also includes a tapered surface 166 adapted to engage first chamfer 54 on female member 30.

With continued reference to FIG. 5, when male member 20 is in the fully coupled or engaged position with female member 30, there is a space between the receiving end 50 and latching sleeve 133 that is, in effect, the end of gap 46. Additionally, the tapered surface 166 of the release sleeve 160 is barely touching or slightly spaced from first chamfer 54 on female member 30. When it is desired to disconnect male member 20 from female member 30, it is simply necessary to move male member 20 forward into female member 30 so that first locking surface 28 is separated from bead 139. Then, release sleeve 160 is moved in a direction toward female member 30, and in doing so, is compressed as tapered surface 166 engages chamfer 54. As release sleeve 160 is compressed, split cylindrical wall 136 and integral bead 139 are also compressed by release sleeve 160 and can be removed from female member 30 along with male member 20.

Figure 6:
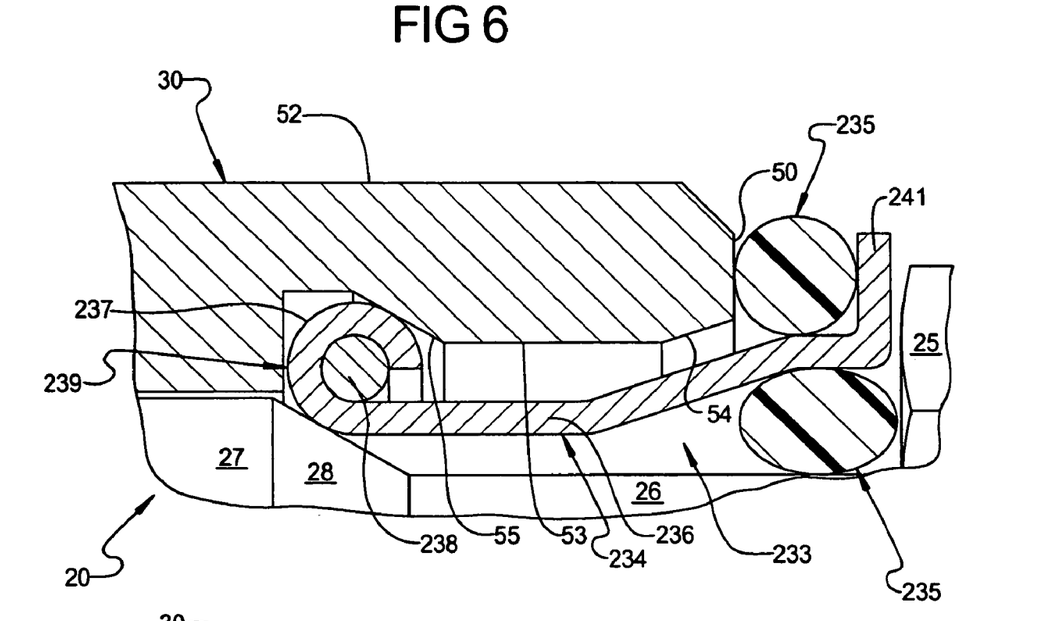
FIG. 6 is a detailed cross-sectional view of a connecting interface according to another embodiment of the present invention.

Referring to FIG. 6 another embodiment of the invention is shown. In the illustrated embodiment, male member 20 includes a latching sleeve 233 having a rigid portion 234 and, optionally, a sealing portion 235. As may be seen in FIG. 6, rigid portion 234 includes a split cylindrical wall 236 adapted to expand and contract. A leading end 237 of latching sleeve 233 includes a resiliently expandable annular support member 238, such as, for example, a split locking ring or a garter spring. Annular support member 238 is secured to latching sleeve 233 within a bead 239. In an embodiment, bead 239 is formed by rolling the leading end 237 around annular support member 238. Latching sleeve 233 also includes a flange 241 positioned on an end of latching sleeve 233 opposite bead 239. In the illustrated embodiment, sealing portion 235 includes a pair of annular sealing members, such as the O-rings shown in FIG. 6. One of the O-rings is positioned between male member 20 and latching sleeve 233 and the other O-ring is positioned between flange 241 and the receiving end 50 of female member 30. In the connected state shown in FIG. 6, the O-rings may be compressed to inhibit the passage of contaminants into the area around bead 239.

Upon insertion of male member 20 into female member 30, the leading end 237 of latching sleeve 233 will compress as it engages first chamfer 54 and then passes through the opening defined by interior cylindrical surface 53 on female member 30 and trailing cylindrical exterior surface 26 on male member 20. As bead 239 moves past the intersection of second locking surface 55 and interior cylindrical surface 53 upon continued forward movement of male member 20, the bead 239, by virtue of the resilience of rigid portion 234 will expand to a size approaching its original size and, in doing so, will be positioned to prevent withdrawal of male member 20 from female member 30 by virtue of bead 239 being positioned to engage first locking surface 28 on male member 20 and second chamfer 55 on female member 30. Furthermore, flange 241 will expand such that an outer edge of flange 241 protrudes above flats 25 to provide a visual indication that male member 20 is properly secured to female member 30. Male member 20 may be removed from female member 30 in the manner described above with respect to FIG. 4.

Figure 7:
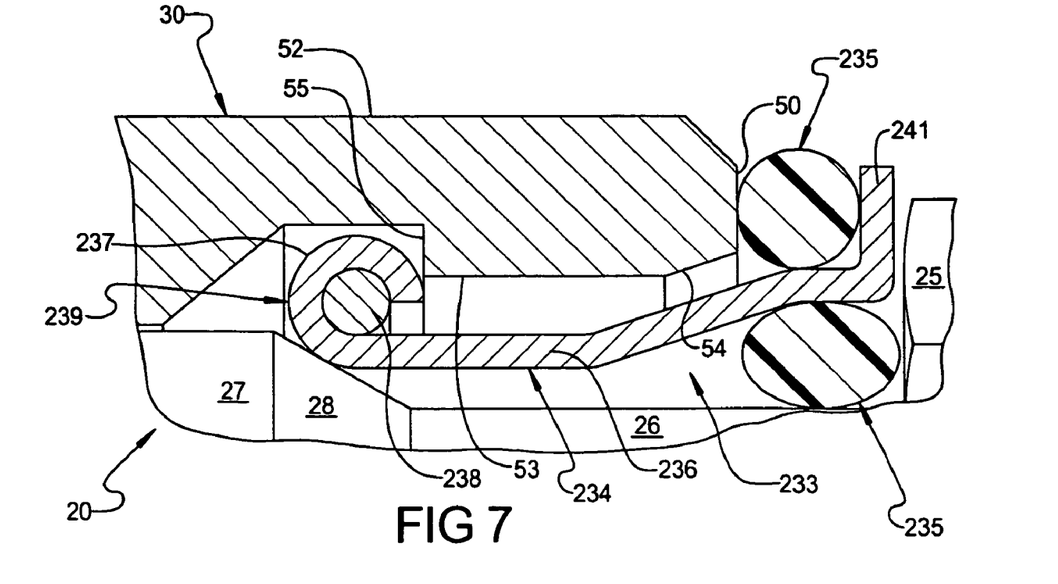
FIG. 7 is a detailed cross-sectional view of another configuration of the connecting interface shown in FIG. 6.
Figure 7A:
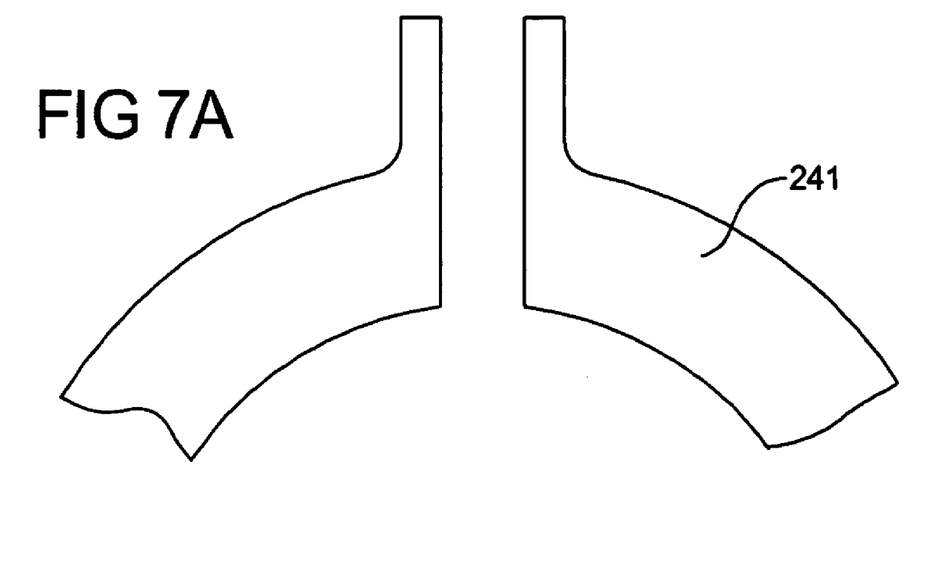
FIG. 7A is an enlarged partial end view of a latching sleeve according to an embodiment of the present invention, for use in the coupling shown in FIG. 7.
Figure 7B:
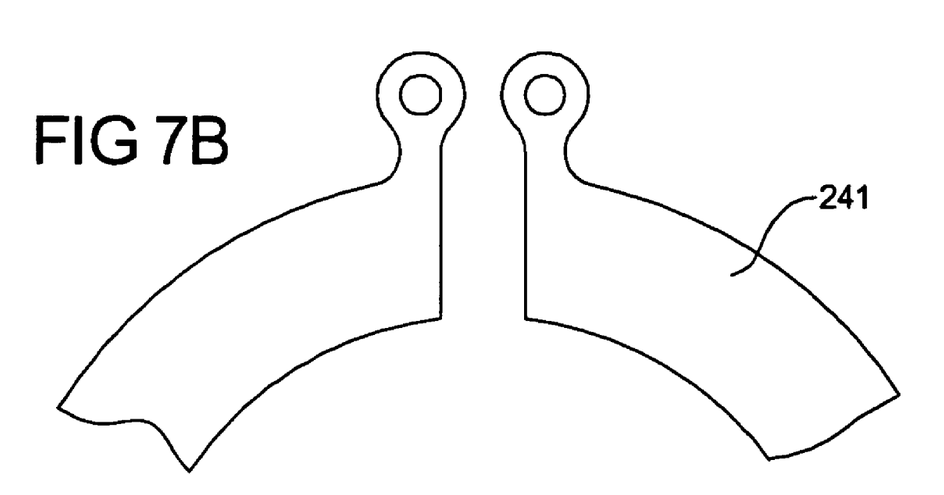
FIG. 7B is an enlarged partial end view of a latching sleeve according to another embodiment of the present invention, for use in the coupling shown in FIG. 7.

Referring to FIG. 7, a coupling assembly connecting interface is shown that is substantially similar to that shown in FIG. 6 with at least one exception, namely, second locking surface 55 is generally perpendicular to interior cylindrical surface 53. While the manner in which the first and second coupling members are connected is the same as the method described above for FIGS. 4-6, latching sleeve 233 must be compressed before pulling latching sleeve 233 or male member 20 from female member 30. In an embodiment, flange 241 may be provided with a pair of finger tabs (see, e.g., FIG. 7A) for compressing latching sleeve 233 using an operator's fingers or handheld pliers, or eyelets (see, e.g., FIG. 7B) for compressing latching sleeve 233 using a handheld tool.

Figure 8:
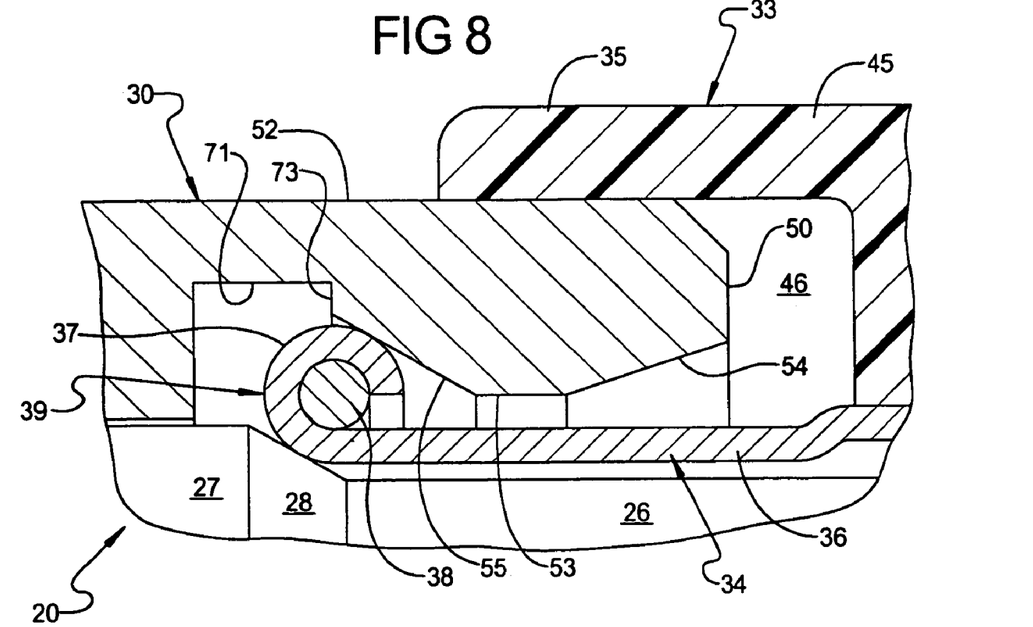
FIG. 8 is a detailed cross-sectional view of a connecting interface according to another embodiment of the present invention.

Referring to FIG. 8, another embodiment of the invention is shown. The embodiment illustrated in FIG. 8 is substantially similar to the embodiment shown in FIG. 4 with at least one exception, namely, female member 30 includes a inwardly facing annular groove 71 sized to receive bead 39. Groove 71 may be positioned next to second locking surface 55, as shown in FIG. 8, or may be spaced apart from second locking surface 55 and/or joined to second locking surface 55 by one or more intermediate surfaces (not shown).

In the embodiment shown in FIG. 8, male member 20 is received in female member 30 in the same manner as that described above with respect to FIG. 4. Particularly, latching sleeve 33 is sized such that upon insertion of first coupling member 20 into second coupling member 30, the latching sleeve 33 expands as it engages second coupling member 30 and then contracts as bead 39 moves over first locking surface 28 to become engaged between first locking surface 28 and second locking surface 55. When it is desired to disconnect male member 20 from female member 30, male member 20 is moved forward into female member 30 and latching sleeve 33 is moved toward leading end 21 of male member 20 to cause bead 39 to engage first locking surface 28 and be urged outwardly into groove 71 by first locking surface 28. As will be appreciated, when bead 39 has been urged into groove 71 and split cylindrical wall 36 has been expanded to a diameter greater than leading exterior surface 27, male member 20 can be removed from female member 30 through latching sleeve 33.

Figure 9:
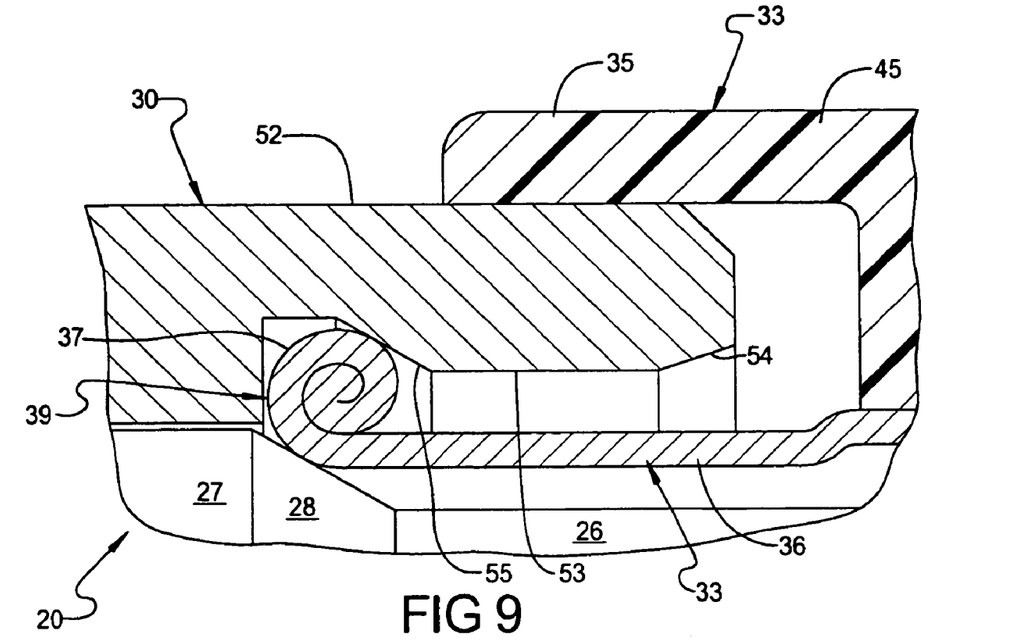
FIG. 9 is a detailed cross-sectional view of a connecting interface according to another embodiment of the present invention.

Referring to FIG. 9, another embodiment of the invention is shown. The embodiment shown in FIG. 9 is substantially similar to the embodiment shown in FIG. 4 with at least one exception, namely, latching sleeve 33 does not include an annular support member 38. Instead, bead 39 is formed by rolling leading end 37 into a coil, for example as shown in FIG. 9. Connection and disconnection of the coupling assembly shown in FIG. 9 is similar to that described above with respect to the embodiment shown in FIG. 4.

Figure 1:
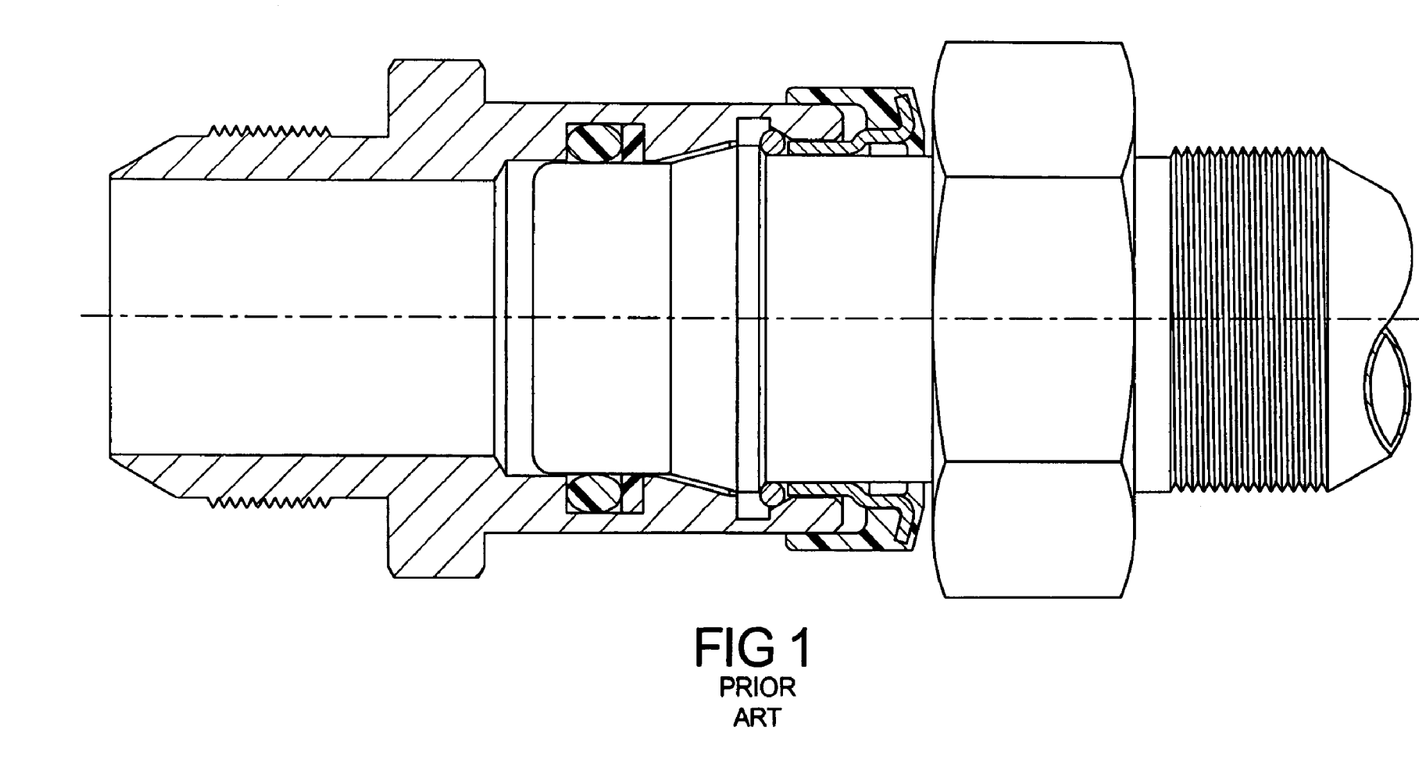
FIG. 1 is a partial cross-sectional view of a prior art coupling assembly.
Figure 2:
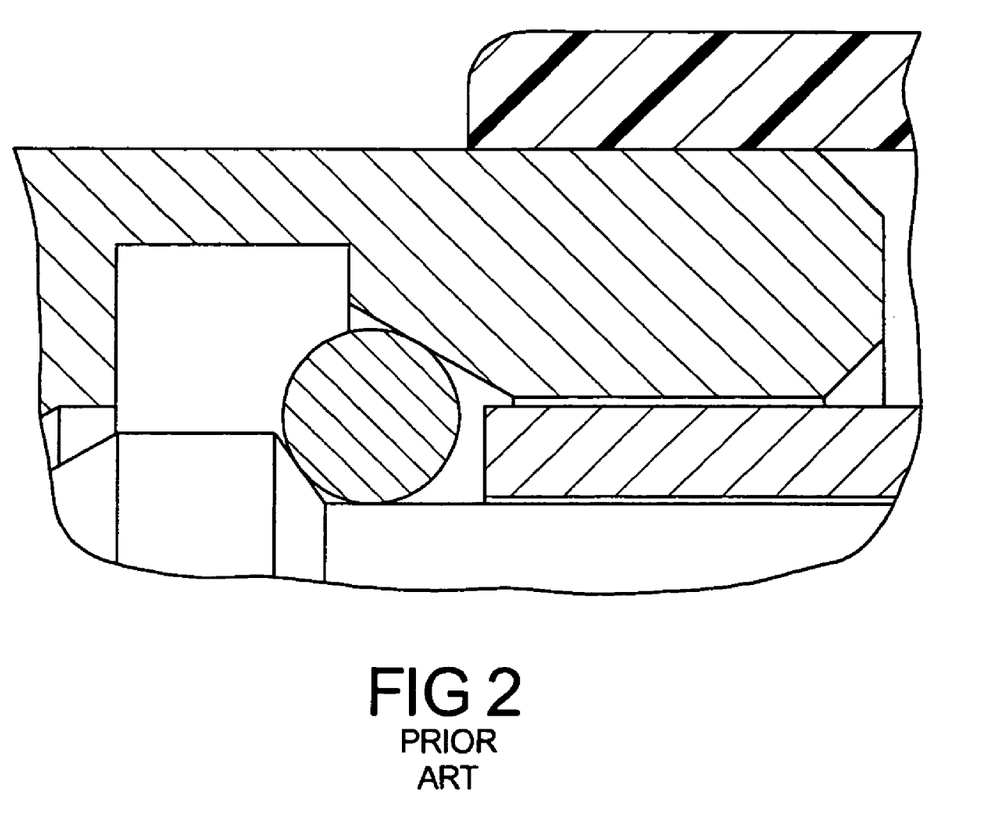
FIG. 2 is a detailed cross-sectional view of the prior art coupling assembly shown in FIG.1.

Among other features, the female coupling member 30 of the present invention includes none of the internal components, such as locking rings, O-rings and back-up rings, found in the prior art coupling assembly shown in FIGS. 1 and 2. Indeed, even the split locking ring found in the prior art coupling assembly is absent in embodiments of the present invention. Additionally, the coupling assembly of the present invention can be configured, as described above, to provide a tactical and/or visual indication that the male coupling member is properly connected to the female coupling member. Moreover, the coupling assembly of the present invention is particularly suited for use in a "direct-port" configuration, because only one groove (e.g., groove 71) is required in female coupling member 30 to connect to the male coupling member 20.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A coupling assembly comprising:
a first coupling member extending along an axis from a leading end to a trailing end and having an exterior that includes a first locking surface;
a second coupling member extending from a receiving end to a remote end and including a receiving portion sized to receive the first coupling member, the second coupling member also including a second locking surface;
a latching sleeve positioned between the first and second coupling members and including a radially outward extending bead, wherein the bead is sized such that as the first coupling member is inserted into the second coupling member, the bead compresses radially inward as it engages the second coupling member and then expands radially outward as it moves over the second locking surface to become engaged between the first locking surface on the first coupling member and the second locking surface on the second coupling member; and
a resiliently expandable annular support member secured to the latching sleeve within the bead.

2. The coupling assembly of claim 1, wherein the exterior of the first coupling member has a trailing exterior cylindrical surface and a leading exterior cylindrical surface, which are separated by the first locking surface that tapers rearwardly and inwardly from the leading exterior cylindrical surface to meet the trailing exterior cylindrical surface.

3. The coupling assembly of claim 1, wherein the first locking surface exhibits a linear profile and tapers at an angle relative to the axis.

4. The coupling assembly of claim 1, wherein the first locking surface exhibits a non-linear profile.

5. The coupling assembly of claim 2, wherein the leading exterior surface has formed therein an outwardly facing annular groove in which is positioned an annular seal and a rigid plastic ring, the annular seal and the plastic ring having an outer diameter sized to engage an inner surface of the second coupling member.

6. The coupling assembly of claim 1, wherein the latching sleeve includes a rigid portion having a cylindrical wall adapted to expand and contract.

7. The coupling assembly of claim 6, wherein the bead is a rolled leading end of the rigid portion.

8. The coupling assembly of claim 6, wherein the latching sleeve includes a sealing portion.

9. The coupling assembly of claim 8, wherein the sealing portion includes a cylindrical wall portion spaced apart from and substantially parallel to the cylindrical wall of rigid portion, and wherein the second coupling member includes an exterior cylindrical surface adjacent the receiving end that engages the cylindrical wall.

10. The coupling assembly of claim 8, wherein the sealing portion includes a sealing fin extending radially inwardly from a flange portion of the rigid portion, the sealing fin engaging the exterior of the first coupling member.

11. The coupling assembly of claim 1, wherein the annular support member is a split locking ring or a garter spring. sealing fin engaging the exterior of the first coupling member.

12. The coupling assembly of claim 1, wherein the receiving portion of the second coupling member includes an interior cylindrical surface, and wherein the second locking surface extends generally outwardly from the interior cylindrical surface.

13. The coupling assembly of claim 1, wherein the second locking surface includes a chamfer.

14. The coupling assembly of claim 1, wherein the second locking surface exhibits a non-linear profile.

15. The coupling assembly of claim 1, wherein the first locking surface and the second locking surface are disposed at converging angles in a direction away from a leading end of the latching sleeve when the first coupling member is secured to the second coupling member.

16. The coupling assembly of claim 1 further including a gap between the latching sleeve and a portion of the first coupling member, the gap positioned to provide an indication that the bead is positioned between the first locking surface and the second locking surface when the first coupling member is secured to the second coupling member and sized to allow the first coupling member to be pushed forward into the second coupling member to separate the first locking surface from the bead.

17. A male coupling member for use in a coupling assembly that includes a female coupling member, the male coupling member comprising:
a body that extends along an axis from a leading end to a trailing end and having a passageway extending therethrough, the body also including a trailing exterior cylindrical surface and a leading exterior cylindrical surface having a larger diameter than the trailing exterior surface, the trailing and leading exterior cylindrical surfaces being separated by a locking surface that tapers rearwardly and inwardly from the leading exterior cylindrical surface to meet the trailing exterior cylindrical surface;

a latching sleeve moveably attached to the body, the latching sleeve including a cylindrical wall adapted to expand and contract and a radially outward extending bead comprising a rolled leading end, the latching sleeve sized such that as the male coupling member is inserted into the female coupling member, the latching sleeve is compressed radially inward as the bead engages the female coupling member and then expands radially outward to become engaged between the locking surface on the male coupling member and the female coupling member; and a resiliently expandable annular support member secured to the latching sleeve within the bead.

18. A coupling assembly comprising:

a first coupling member extending along an axis from a leading end to a trailing end and having an exterior that includes a first locking surface;

a second coupling member extending from a receiving end to a remote end and including a receiving portion sized to receive the first coupling member, the second coupling member also including a second locking surface; and a latching sleeve including a rigid portion positioned between the first and second coupling members and including a radially outward extending bead, wherein the bead is a rolled leading end of the rigid portion and is sized such that as the first coupling member is inserted into the second coupling member, the bead compresses radially inward as it engages the second coupling member and then expands radially outward as it moves over the second locking surface to become engaged between the first locking surface on the first coupling member and the second locking surface on the second coupling member.

* * * * *